US011237747B1

(12) United States Patent
Greenwood et al.

(10) Patent No.: US 11,237,747 B1
(45) Date of Patent: Feb. 1, 2022

(54) ARBITRARY SERVER METADATA PERSISTENCE FOR CONTROL PLANE STATIC STABILITY

(71) Applicant: Amazon Technologies, Inc., Seattle, WA (US)

(72) Inventors: Christopher Magee Greenwood, Seattle, WA (US); Bhagyasri Pavuluri, Seattle, WA (US); Jing Wang, Seattle, WA (US); Avram Israel Blaszka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/434,063

(22) Filed: Jun. 6, 2019

(51) Int. Cl.
*G06F 3/06* (2006.01)
*G06F 9/455* (2018.01)

(52) U.S. Cl.
CPC .......... *G06F 3/0647* (2013.01); *G06F 3/0604* (2013.01); *G06F 3/067* (2013.01); *G06F 3/0644* (2013.01); *G06F 3/0659* (2013.01); *G06F 3/0664* (2013.01); *G06F 9/45533* (2013.01)

(58) Field of Classification Search
CPC .... G06F 3/0647; G06F 3/0604; G06F 3/0644; G06F 3/0659; G06F 3/0664; G06F 3/067; G06F 9/455533
See application file for complete search history.

(56) References Cited

U.S. PATENT DOCUMENTS

| 9,823,840 | B1* | 11/2017 | Brooker | G06F 3/0604 |
| 9,971,526 | B1* | 5/2018 | Wei | G06F 3/0619 |
| 2003/0191904 | A1* | 10/2003 | Iwami | G06F 3/0664 |
| | | | | 711/147 |
| 2013/0339297 | A1 | 12/2013 | Chen | |
| 2014/0123136 | A1* | 5/2014 | Beda, III | G06F 16/144 |
| | | | | 718/1 |
| 2014/0244929 | A1 | 8/2014 | Acharya et al. | |
| 2015/0019829 | A1 | 1/2015 | Sivasubramanian et al. | |
| 2016/0080495 | A1 | 3/2016 | Bilas et al. | |
| 2017/0192857 | A1 | 7/2017 | Meiri et al. | |
| 2017/0222890 | A1 | 8/2017 | Dippenaar et al. | |
| 2017/0329528 | A1 | 11/2017 | Wei et al. | |
| 2017/0364411 | A1 | 12/2017 | Fan et al. | |

(Continued)

OTHER PUBLICATIONS

Gao et al. "Building a Distributed Block Storage System for Cloud Infrastructure," $2^{nd}$ IEEE International Conference on Cloud Computing Technology and Science, IEEE, 2010, pp. (312-318) (Year: 2010).

(Continued)

*Primary Examiner* — Nanci N Wong
(74) *Attorney, Agent, or Firm* — Knobbe Martens Olson & Bear, LLP

(57) ABSTRACT

Systems and methods are disclosed for reducing interdependency among control plane on a block storage system. Embodiments described herein can implement a key-value data store on the data plane servers. In one embodiment, the key-value store stores data regarding placement constraints and enables the block storage system to make placement decisions without control plane dependencies. In another embodiment, the key-value store persisted by the data plane enable the block storage system to migrate volumes while maintaining performance settings.

20 Claims, 8 Drawing Sheets

(56) References Cited

U.S. PATENT DOCUMENTS

2018/0157521 A1* 6/2018 Arikatla ............. G06F 9/45558
2019/0004863 A1* 1/2019 Mainali ............... G06F 16/9014

OTHER PUBLICATIONS

Orlando et al., "IBM SmartCloud Virtual Storage Center," IBM Red Book, IBM Technical Support Organization, Feb. 2015, pp. (1-238) (Year: 2015).

* cited by examiner

ARBITRARY SERVER METADATA PERSISTENCE FOR CONTROL PLANE STATIC STABILITY

BACKGROUND

Hosted or "cloud" computing, in general, is an approach to providing access to information technology resources through services, such as Web services, where the hardware and/or software used to support those services is dynamically scalable to meet the needs of the services at any given time. The ability to provide on demand virtual computing resources and storage through hosted computing and virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware.

Hosted computing environments can provide various guarantees as to the availability and durability of computing resources. Distributing computing resources amongst multiple resource hosts or servers can provide different availability and durability characteristics. For example, virtual computing resources in a hosted computing environment can provide block-based storage. Such block storage provides a storage system that is able to interact with various virtual machine instances through a series of standardized storage calls that render the block-based storage functionally agnostic to the structural and functional details of the volumes that the storage supports and the operating systems executing on the virtual machine instances to which the storage provides storage availability. In order to provide block-based storage, various control plane components in the storage system architecture can implement placement optimizations and/or constraints in order to provide performance guarantees. Because of the multiple dependencies among control plane components, a failure of just one control plane component can negatively affect block-based storage availability in hosted computing environments.

DETAILED DESCRIPTION

Figure 1:
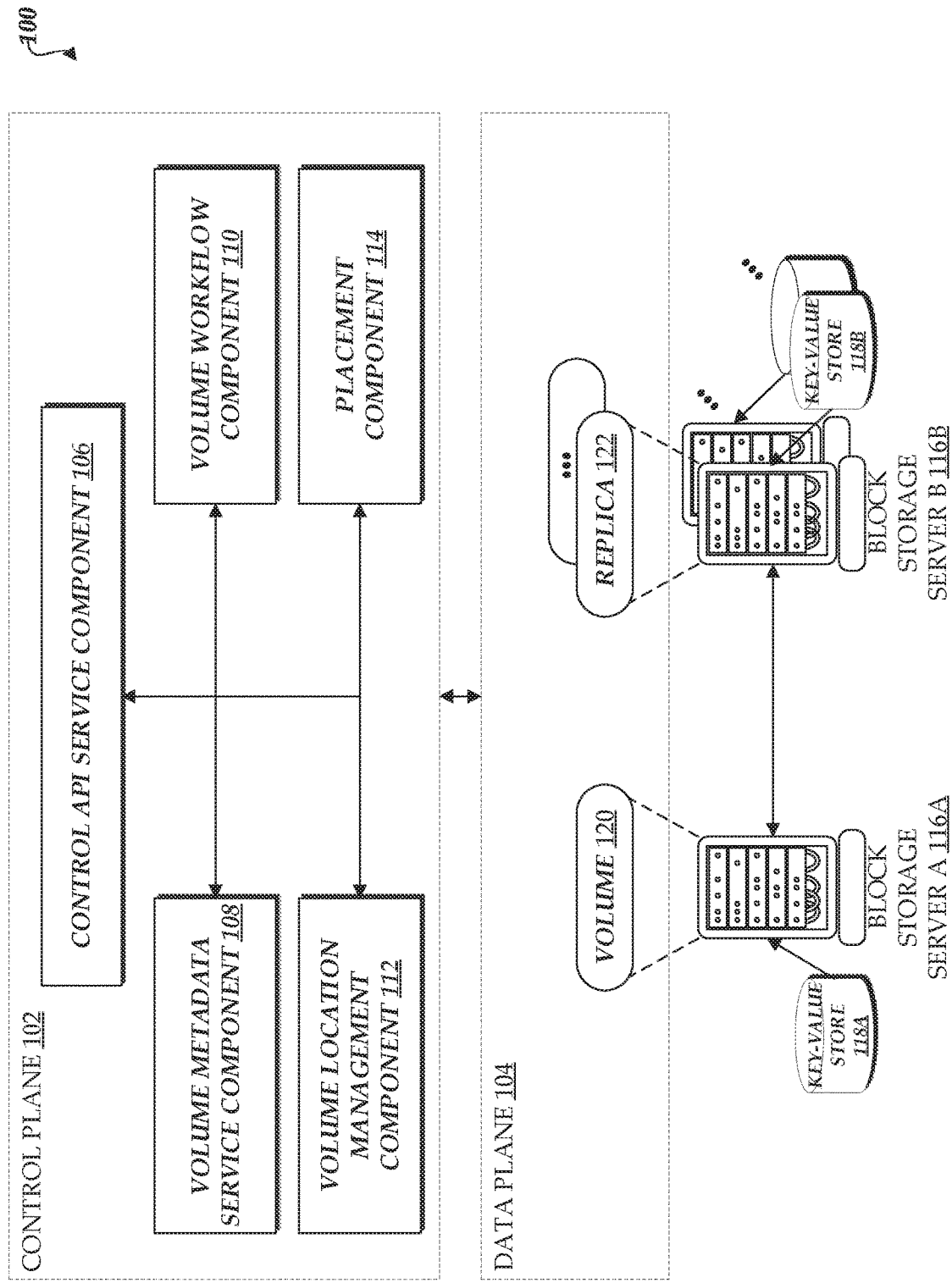
FIG. 1 depicts a schematic diagram of a block storage system comprising a control plane and a data plane.

Generally described, aspects of the present disclosure relate to improving the availability and reliability of a block storage system. A block storage system can provide to clients of the system network-based access to block storage volumes (or simply, "volumes"), readable and writable by computing devices at a block level. The block storage system can be configured for rapid configuration of volumes, such that a client can request on-demand creation of a volume for use by a virtual machine instance of the client. For example, a client can implement applications on a virtual machine instance on a hosted computing environment (sometimes known as a "cloud" computing environment) and request, from the block storage system, a volume for use by that instance. A placement algorithm can be used to locate available space for the volume at a block storage server within the block storage system, and to allocate that space for use by the instance. The block storage system can provide other features to create a more robust block storage system. For example, the block storage system can utilize a placement algorithm to migrate a volume to another block storage server to dynamically maintain optimal access to the volume. Thus, the block storage system can rapidly configure volumes and maintain rapid access to the volumes even when computing demands change (e.g., client requests higher Input/Output Operations per Second (IOPS)). The block storage system can also use a backup algorithm to create a replica of a volume and store the replica at a second storage server physically separate from a first block storage server at which the volume is stored. The volume that is configured to be accessed by the client during standard operation can be referred to as the master volume. The backup volumes that are stored at block storage servers but are not accessed by the client during standard operation can be referred to as replicas. Thus, upon failure of the first block storage server storing the master volume a replica can be used to maintain the client's access to the volume (referred to as "failover").

A block storage system generally includes a plurality of components that can be categorized as data plane components or control plane components. The data plane includes multiple hosts, such as block storage servers, where the block storage volumes are stored. The block storage servers can have different performance characteristics. For example, some block storage servers may implement solid state drives (SDD) and some block storage servers may implement hard disk drives (HDD). The control plane generally includes one or more control plane components distributed across and implemented by one or more control servers. The control plane components are typically implemented on a separate set of servers from the block storage servers. While the data plane represents the movement of user data through the distributed computing system, the control plane represents the movement of control signals through the distributed computing system. Generally described, processing or computing on the block storage servers in the data plane is minimal; the block storage servers in the data plane mainly serve as storage nodes. On the other hand, the control plane components have computing and processing capabilities and orchestrate the various functions of the block storage service.

As described in detail herein, aspects of the present disclosure relate to decreasing interdependency in a block storage system between different components of the control plane during storage and migration of volumes on the block storage servers in the data plane. The various functions of a block storage system require multiple control plane components, and thus some control plane components become critical to block storage system function, such as placement of a replica of a volume in the data plane. For example, generally, when a replica of a volume is requested, a placement component in the control plane can obtain information regarding the volume from a volume metadata service component also in the control plane to determine whether the replica of the volume must be stored on a block storage server that meets certain performance characteristics. The placement component can collect and store information, operational metrics, metadata, or any other information from the block storage servers to analyze which available block storage servers meet the performance characteristics criteria as required by the volume. Upon analysis, the placement component can recommend a specific block storage server on to which to store the replica. As evidenced in this example, the placement component cannot proceed to recommending a block storage server without receiving information from the volume metadata service component. This interdependency may reduce the availability and durability of the block storage system. If the volume metadata service component or the communication between the volume metadata service component and placement component were to fail, the block storage system would be unable to provide replica services, thereby increasing the risk that a volume is lost. Thus, minimizing interdependency among control plane components can improve the availability and durability of the block storage system.

Aspects of the present disclosure provide a technical solution to the technical problems caused by interdependent control plane components. Interdependency among control plane components can result in cascading failures, in which the unavailability of one control plane component prevents downstream control plane components (e.g., components that require data from the unavailable component) from completing their own workflows. More specifically, aspects of the present disclosure relate to reducing interdependency among control plane components by persisting metadata associated with a volume stored by the block storage servers in the data plane, and not in the control plane with the control plane components. Metadata associated with the volume can be generated by one or more control plane components and then stored and persisted by the block storage servers during creation and migration of volumes and storage of replicas. Thus, when storage of a replica is requested, for example, by a block storage server in the data plane, the placement component in the control plane can obtain metadata persisted at a block storage server to determine whether a replica must be stored on a block storage server satisfying certain criteria as indicated in the metadata. The placement component does not have to probe other control plane components to generate a recommendation identifying which block storage server in the data plane the replica should be stored. Thus, by persisting the metadata in the block storage servers rather than any of the control plane components, the block storage system can continue to maintain functions such as creating replicas for volumes even in situations of control plane architecture outages.

The metadata persisted in the data plane can be stored in the form of key-value data and accordingly stored in a persistent key-value store. Generally described, a key-value store, or key-value database, is a data storage scheme designed to store, retrieve and manage associative arrays, sometimes referred to as a dictionary or hash table. Key-value stores contain objects that can have different keys, or fields, within the objects; such flexibility allows a key-value store to store various objects without pre-defined fields. These objects can be retrieved by querying a unique key and value. In the present application, a key-value object can be identified by a unique volume identifier, client namespace, and/or a client identifier. The key-value object can contain keys, or fields, such as volume storage conditions, token bucket data, and other metadata. The nature of key-value data allows the system to flexibly append additional key-value pairs indicating other metadata or volume storage conditions associated with the volume. A "persistent" or "persisted" key-value store can refer to a data store that outlives the process that created the data. A "persistent" or "persisted" key-value store can remain persistent and maintain the key-value data even after a server restart or unexpected shutdown.

When a volume is initially stored on a block storage server in the data plane, the control plane components can transmit the metadata described above along with the volume data to the block storage server. In some embodiments, the size of the metadata is minimized to reduce network usage for the transfer of metadata and also to reduce processing burden on the block storage server. In some embodiments, the size of the metadata can be limited by a threshold, for example, 5 kilobytes (kB), 10 kB, 25 kB, 50 kB, 100 kB, or 1 megabyte (MB). In some embodiments, each block storage server can be configured to require a metadata size limit. The block storage server can store the metadata in its memory. In some embodiments, the block storage server can create a separate partition in its memory to dedicate for storage of the volume metadata. In some embodiments, the block storage server can include a physically separate data store dedicated to storing and persisting volume metadata. The block storage server can be configured to respond to application programming interface (API) calls or requests from control plane components for key-value data. The block storage server can be configured to persist the key-value data through process restarts, block storage server reboots, and migrations between block storage servers. In some embodiments, the block storage server does not modify the key-value data and does not make any decisions based on the key-value data.

Some aspects of the present disclosure relate to using key-value data stores persisted in the data plane to implement and back up volumes on servers implementing high durability storage. A client may request that the block storage system store a volume on a block storage server with a high durability rating because the information stored on the volume is critical to the client's operation. In such embodiments, the block storage system can designate the initial volume as requiring high durability storage. The placement component in the control plane can identify a block storage server with high durability performance characteristics and cause storage of the volume at that block storage server. The placement component also causes transmission of key-value data comprising a durability criterion indicating "high durability" to the block storage server and the block storage server stores the key-value data along with the volume data. To ensure that the volume remains highly durable in cases of failure of the master volume, the placement component also stores the replica on a block storage server that satisfies the high durability criterion. Thus, when a placement component receives a request to identify a block storage server on which to store a replica, the placement component in the control plane obtains the key-value data associated with the volume from the block storage server storing the master volume. If the placement component determines that the durability criterion in the key-value data indicates high durability, the placement searches for a block storage server in the data plane that satisfies the performance characteristics. If the durability criterion does not indicate any durability requirement, the placement can recommend a block storage server based on a default optimization routine or some other routine or criterion. In some embodiments, the placement component receives a request to store a replica from the block storage server storing the master volume. In some embodiments, a block storage server requests a replica when the block storage server determines that the backup block storage server storing the replica has failed or the block storage server has lost communication with the backup block storage server. In some embodiments, the placement component itself can determine that a replica is to be stored in a new block storage server to optimize access or durability of the volume.

High durability storage for a volume may be achieved in the block storage system by various means including an increased number of replicas (e.g., three or more), faster remirror initiation (where remirroring refers to the creation of a new replica peer after failure of a replica), or a high durability storage architecture. Such a high durability storage architecture can include a rack including a number of head nodes that have shared access to a number of data storage drives. In this architecture, a set of recent writes to a volume can be replicated across two or more of the head nodes, and periodically the writes can be flushed from the head nodes to designated ones of the drives in the shared storage using erasure encoding.

Some aspects of the present disclosure relate to using a key-value data store persisted at a block storage server in the data plane to detach and reattach volumes while keeping throttling levels associated with the volume consistent through the detachment and reattachment. To balance computing and network load, a networked computing system can set performance limits on a client's access to the block storage system by throttling access to a volume stored on the block storage system. For example, networked computing system can implement throughput limits and can throttle input/output requests from the client when the client reaches the IOPS limit. In some embodiments, the networked computing system can provide tiered levels of permissible IOPS to a client based on the client's subscription to the networked computing service. The networked computing system can implement a token bucket algorithm to throttle client requests to the block storage. Generally described, a token bucket algorithm is used to count each request as a token and "hydrate" the token bucket with a token (or add a token to the token bucket) each time a request to access the volume is processed. When the token bucket "fills up," the input/output requests can be throttled. In conventional block storage systems, when a volume is detached and reattached to a new virtual machine instance, the token bucket is reset. Thus, the block storage system is not able to migrate volumes without undermining the throttling feature of the networked computing system.

Some aspects of the present disclosure provide a technological solution to this technological problem by implementing persistent key-value stores that store token bucket information at the block storage servers. For example, a volume metadata system component in the control plane can receive instructions to detach a volume from one virtual machine and attach to another virtual machine. In some embodiments, the detachment and attachment is triggered by a client instruction. In other embodiments, the detachment and attachment is triggered by another control plane component carrying out an optimization routine or algorithm. The requesting virtual machine can instruct volume detachment to a component in the control plane such as the volume metadata system component via an API call. The instruction can include identification of a second virtual machine to which to attach the volume. In response to the instruction, the volume can be detached from the requesting virtual machine. The volume metadata system component can instruct the second virtual machine identified in the request to attach to the volume. In response to attachment of the second virtual machine to the volume, the block storage server storing the volume can transmit token bucket data associated with the attached volume to the compute server hosting the virtual machine instance or the virtual machine instance. For example, the token bucket data can indicate the number of input/output requests from the client to the volume. Thus, the throttling token bucket information has been persisted through the detachment and attachment of the volume.

Overview of Example Network Based Block Storage System

FIG. 1 depicts an example network-based block storage system 100 implementing block storage server-side, persistent key-value stores 118A, 118B. FIG. 1 depicts a control plane 102 and a data plane 104 of the block storage system 100. The data plane 104 represents the storage of client data in the block storage system 100 on block storage servers 116A and 116B, while the control plane 102 represents the components that control the movement of client data through the block storage system 100. One skilled in the art will appreciate that the control plane 102 and data plane 104 represent logical constructs related to the operation of the block storage system 100, rather than a physical configuration of the components of the block storage system 100.

The control plane 102 is a logical construct that can be implemented by one or more computing system with computer-executable software, as described herein. In some embodiments, the control plane 102 components are implemented on one or more control servers. The control plane 102 can include one or more computing systems that are configured for coordinating system and client requests and propagating the volumes to the appropriate block storage servers 116A, 116B in the data plane 104. Functions of the control plane 102 can include, for example, replication of data, failover operations, and receiving requests from clients for specific actions to be performed with respect to the data plane 104. These requests can include, among others, requests for migrating a volume 120 and creating a replica 122 of the volume 120.

As depicted in FIG. 1, the control plane 102 includes multiple components 106, 108, 110, 112, 114. In some embodiments, each component 106, 108, 110, 112, 114 can be implemented on individual computing systems, as described herein. In some embodiments, two or more components 106, 108, 110, 112, 114 can be implemented on the same computing system. In some embodiments, the control plane components 106, 108, 110, 112, 114 communicate with other components 106, 108, 110, 112, 114 via a network. In some embodiments, the components 106, 108, 110, 112, 114 communicate via API calls and responses.

In some embodiments, the control plane 102 includes a control API service component 106. The control API service component 106 can receive all requests from the client. In some embodiments, the control API service component 106 is configured to receive API calls from clients and route client requests to the appropriate control plane component. In some embodiments, the control plane 102 includes a volume metadata service component 108. The volume metadata service component 108 can be configured to obtain and store information regarding a client and the client's volumes. For example, the volume metadata service component 108 can obtain and store volume identifiers, client identifiers, size of volume, type of volume, and encryption status. In some embodiments, the volume metadata service component 108 includes a data store configured to store the metadata. In other embodiments, the volume metadata service component 108 can trigger asynchronous calls to control plane components to migrate volumes. The control plane 102 may also include a volume workflow component 110. The volume workflow component 110 can be configured to route volumes to a block storage server 116A or 116B in the data plane. The volume workflow component 110 can be configured to instruct block storage servers 116A and 116B in the data plane 104 to store or move volumes. The volume workflow component 110 can be configured to communicate with the placement component 114 to request a recommendation for a block storage server on which to store a volume. The volume workflow component 110 can be configured to report the storage or removal to the volume location management component 112. In some embodiments, the volume location management component 112 is configured to store which block storage servers store volume 120 and its replica 122.

In some embodiments, the control plane 102 includes a placement component 114. The placement component 114 can be configured to implement volume placement in accordance with embodiments of the present disclosure. The placement component 114 can be configured to collect information, operational metrics, metadata, or any other information for performing volume placement. The placement component 114 may periodically sweep block storage servers 116A, 116B with a query for the information, operational metrics, or metadata. For example, block storage servers may provide current utilization metrics, ongoing tasks or operations (e.g., such as migration or remirror tasks), and any other state information for the block storage servers, including volume specific information for volumes stored at the block storage servers. A placement component 114 can include a data store configured to persist the collected data. In some embodiments, the placement component 114 can be further configured to dynamically or proactively migrate currently placed volumes from one block storage server to another block storage server so that the placement for the volume is more optimal.

Though FIG. 1 depicts the control plane 102 comprising a control API service component 106, volume metadata service component 108, volume workflow component 110, volume location management component 112, and placement component 114, it should be understood that the control plane 102 can include components not depicted in FIG. 1. For example, in some embodiments, the control plane 102 can include an analytics component configured to provide metering data and/or volume health data. In some embodiments, the control plane 102 can include a backup service configured to expose to clients APIs that enable the client to access and manage replicas.

As depicted in FIG. 1, the data plane 104 can include a plurality of block storage servers hosting a plurality of volumes and replicas. In some embodiments, the data plane 104 can include block storage servers 116A, 116B. Each block storage server 116A, 116B can respectively store data volumes 120 and replicas 122 of data volumes. Each block storage server 116A, 116B includes a persistent key-value store 118A, 118B. In some embodiments, data volumes can differ in size from other data volumes. Block storage servers 116A, 116B can also provide multi-tenant storage. In some embodiments, block storage servers 116A, 116B can include one or more types of storage devices (e.g., hard disk drives, solid state drives, flash memory devices, etc.). For example, some block storage servers can implement solid state drives (SSDs) for persistent block storage, while other block storage servers can implement hard disk drives (HDDs) or other magnetic-based persistent storage devices. In some embodiments, the block storage servers 116A, 116B may be located within different infrastructure zones. Infrastructure zones may be defined by devices, such as server racks, networking switches, routers, or other components, power sources (or other resource host suppliers), or physical or geographical locations (e.g., locations in a particular row, room, building, data center, fault tolerant zone, etc.). Infrastructure zones may vary in scope such that a block storage server 116A hosting volume 120 and block storage server 116B hosting replica 122 may be within multiple different types of infrastructure zones, such as a particular network router or brick, a particular room location, a particular site, etc.

In some embodiments, the persistent key-value stores 118A, 118B are stored on the block storage server 116A, 116B. Key-value store 118A, 118B can be implemented as a database or otherwise searchable/query-able storage system. In some embodiments, the block storage server 116A, 116B create a partition in the block storage server 116a, 116B to store a volume dedicated to store the key-value data. The block storage server 116A, 116B can store the key-value data in a storage device distinct from the storage devices hosting the volumes 120. The key-value store 118A, 118B stores metadata associated with each volume 120 or replica 122 stored on the block storage servers 116A, 116B. Each volume 120 or replica 122 is associated with a unique key or identifier. The key-value store 118A, 118B stores metadata that the block storage server 116A, 116B receives from a control plane component as key-value pairs on the key-value object corresponding to the volume. Though FIG. 1 depicts the data plane 104 including two block storage servers 116A and 116B with respective key-value stores 118A and 118B, it should be understood that the data plane 104 can include any number of block storage servers and key-value stores.

In some embodiments, a replica 122 is a point-in-time block-level backup of a volume 120, stored as a copy of data in the volume on one or more of block storage servers 116B. In some embodiments, replicas can be implemented as incremental records of data within a volume. When creating a replica 122, any data written to the volume up to the time the replica is created can be included in the replica, and clients can continue to perform I/O operations to their volumes during replica creation without affecting the replica. Clients can create a new volume from a replica, for example to create duplicates of their volumes or to restore data. The new volume will contain all the data stored in the replica, and thus, will be a duplicate of the master volume at the time the replica was created.

Overview of Example Networked Computing Environment

Figure 2:
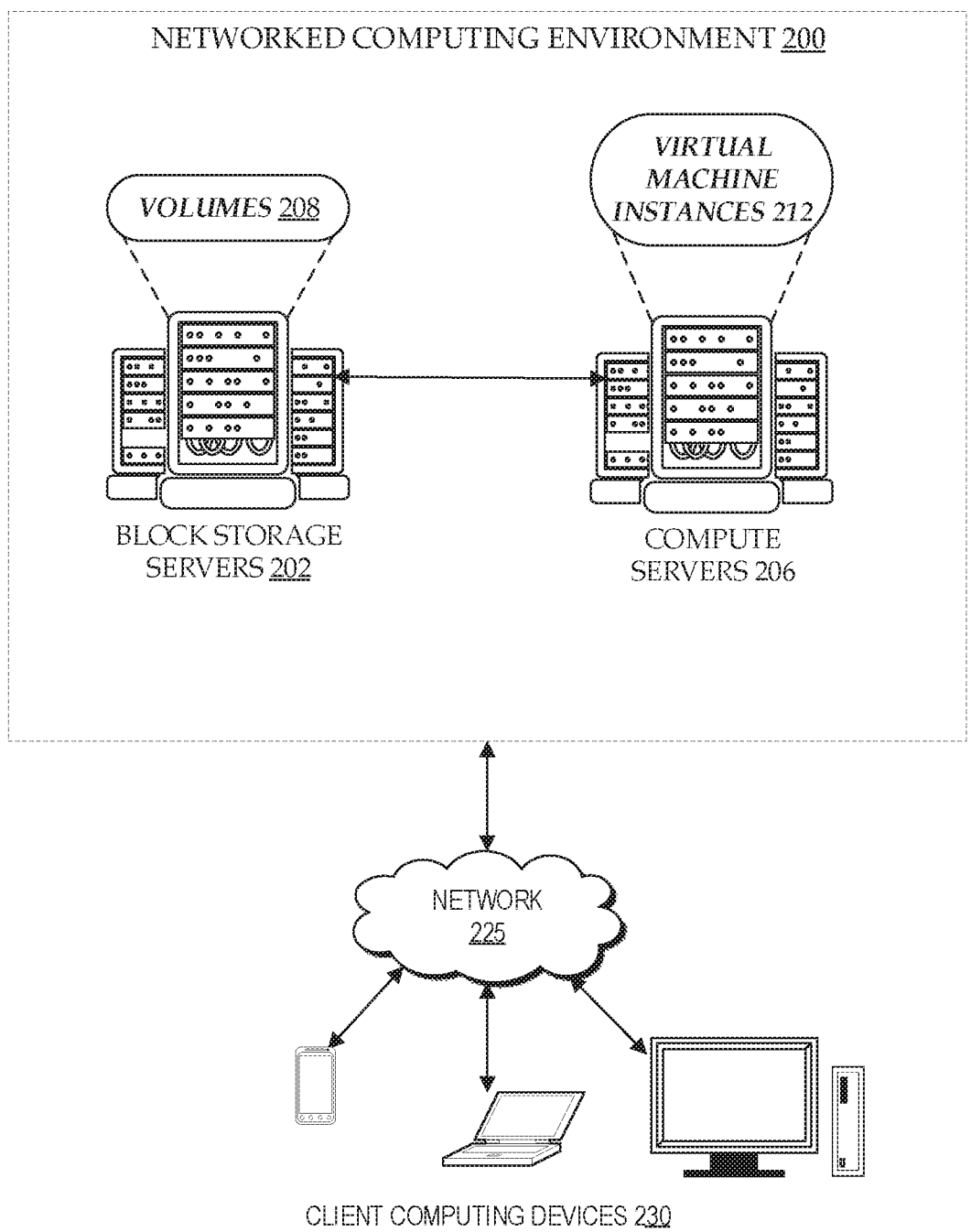
FIG. 2 depicts a schematic diagram of networked computing environment in which various embodiments according to the present disclosure can be implemented.

FIG. 2 depicts an example networked computing environment 200 including a block storage servers 202 in which the disclosed data plane persisted key-value stores can be implemented. The block storage servers 202 hosting volumes 208 are in network communication with one or more compute servers 206 hosting virtual machine instances 212. These servers 202 and 206 can be in network communication with one another and client computing devices 230 to provide clients with on-demand access to computing resources including volumes 208 and instances 212, among others. The network communication can include any appropriate network, including an intranet, the Internet, a cellular network, a local area network or any other such network or combination thereof. Some implementations of networked computing environment 200 can additionally include elastic compute servers providing computing resources, domain name services (DNS) servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The networked computing environment 200 can communicate over network 225 with client computing devices 230. The network 225 can include any appropriate network, including an intranet, the Internet, a cellular network, a local area network or any other such network or combination thereof. Client computing devices 230 can include any network-equipped computing device, for example desktop computers, laptops, smartphones, tablets, e-readers, gaming consoles, and the like. Clients can access the networked computing environment 200 via their client computing devices 230, over the network 225, to view or manage their data and computing resources, as well as to use websites and/or applications hosted by the networked computing environment 200.

The networked computing environment can provide on-demand, scalable computing platforms to clients for example by allowing clients to have at their disposal scalable virtual machines via their use of block storage servers 202 and compute servers 206. These virtual machines can have attributes of a personal computing device including hardware (various types of processors, local memory, random access memory (RAM), hard-disk and/or solid state drive (SSD) storage), a choice of operating systems, networking capabilities, and pre-loaded application software. Each virtual computing device may also virtualize its console input and output (I/O) (e.g., keyboard, display, and mouse). This virtualization allows clients to connect to their virtual machine using a computer application such as a browser, application programming interface, software development kit, or the like, in order to configure and use their virtual computing device just as they would a personal computing device. Unlike personal computing devices, which possess a fixed quantity of available hardware resources, the hardware associated with the virtual machines can be scaled up or down depending upon the required resources.

Virtual machine instances 212 hosted on compute servers 206 can store data as one or more volumes 208 stored on the block storage servers 202. Volumes 208 may be partitioned a number of times (e.g., up to 16) with each partition hosted by a block storage server 202. The block storage servers 202 can be configured to mirror the content of volumes 208 between block storage servers and synchronously replicate data across redundant block storage servers. For example, the block storage servers 202 can have built-in redundancy for volumes by replicating the volume across multiple block storage servers within an availability zone (e.g., a master or primary replica and one or more synchronous secondary replicas), which means that volumes will not fail if an individual drive fails or some other single failure occurs. The partitions may be hosted by different block storage servers 202, and each partition may be individually replicated as a primary replica and one or more secondary replicas. The term "volume" as used herein may refer to an entire volume or to a particular partition of a volume. The master replica can support read and write operations (input/output operations, or "I/O operations") from the client, and thus the block storage servers 202 can be accessible to the client.

Example Key-Value Data Initialization Process

Figure 3:
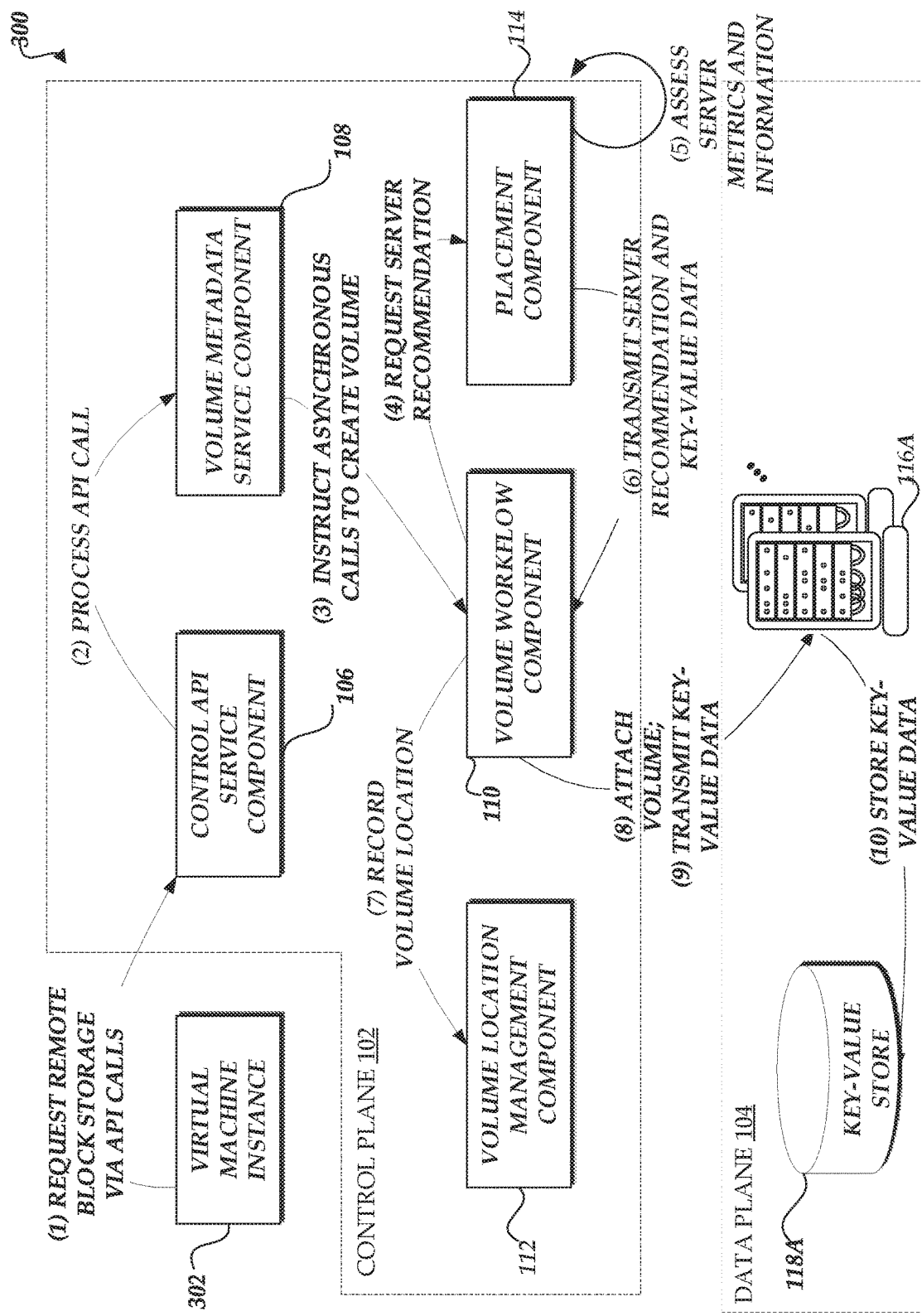
FIG. 3 depicts a schematic diagram of an example workflow for initializing key-value data in the block storage system shown in FIG. 1.

FIG. 3 is a schematic diagram illustrating the interactions during an example key-value data initialization process 300. The process 300 is implemented by components in the control plane 102 and components in the data plane 104. The process 300 begins at (1) where a virtual machine instance 302 requests block storage in the network-based block storage system 100. The virtual machine instance 302 can implement a client that manages I/O operations to virtualized block storage. The virtual machine instance 302 can request block storage for data generated by its operations in a compute server 206. In some embodiments, the client can request block storage for data generated on a client computing device 230. The virtual machine instance 302 can transmit a request to the block storage system 100 by implementing API calls that are exposed to the virtual machine instance 302 by the control API service component 106 in the control plane 102. At (2), the control API service component processes the API call and routes the request to the volume metadata service component 108 in the control plane. The volume metadata service component 108 can store information regarding the client and the client request represented in the processed API call in a data store. For example, the volume metadata service component 108 can store geographical location of the client, regional preference of the client, size of the requested volume, client subscription information, and requested performance characteristics.

At (3), the volume metadata service component 108 instructs the volume workflow component 110 to invoke asynchronous calls to store a volume on the block storage servers 116A, 166B. At (4) the volume workflow component requests a block storage server recommendation from the placement component 114 in the control plane 102. At block (5), the placement component 114 assesses server operational metrics, server metadata, and/or information regarding server operations that the placement component collects and stores. In some embodiments, the placement component can query the data storage servers 116A, 116B of the data plane 104 for server operational metrics, server metadata, and/or information regarding server operations. At block (6), the placement component 114 transmits the block storage server recommendation, as generated by process 400 described below, comprising identification of a recommended block storage server and key-value data associated with volume. The placement component 114 can extend the response payload to the volume workflow component 110 to include the key-value data associated with the volume.

At (7), the volume workflow component 110 records in the volume location management component 112 the recommended block storage server of the volume as the master volume location. In some embodiments, (7) occurs simultaneously with or before (8). At (8), the volume workflow component 110 stores the volume on the recommended block storage server 116A. At (9), the volume workflow component 110 transmits the key-value data associated with the volume to the recommended block storage server 116A in the data plane 104. (8) and (9) can occur in the same instruction, or API call. For instance, the create-volume API can include a key-value argument. In some embodiments, the volume workflow component may transmit the key-value data with a separate API call. At (10), the block storage server 116A stores the received key-value store 118A. The block storage server 116A can be configured to limit read and modify capabilities to minimize processing load by the block storage server 116A.

Example Key-Value Generation Process

Figure 4:
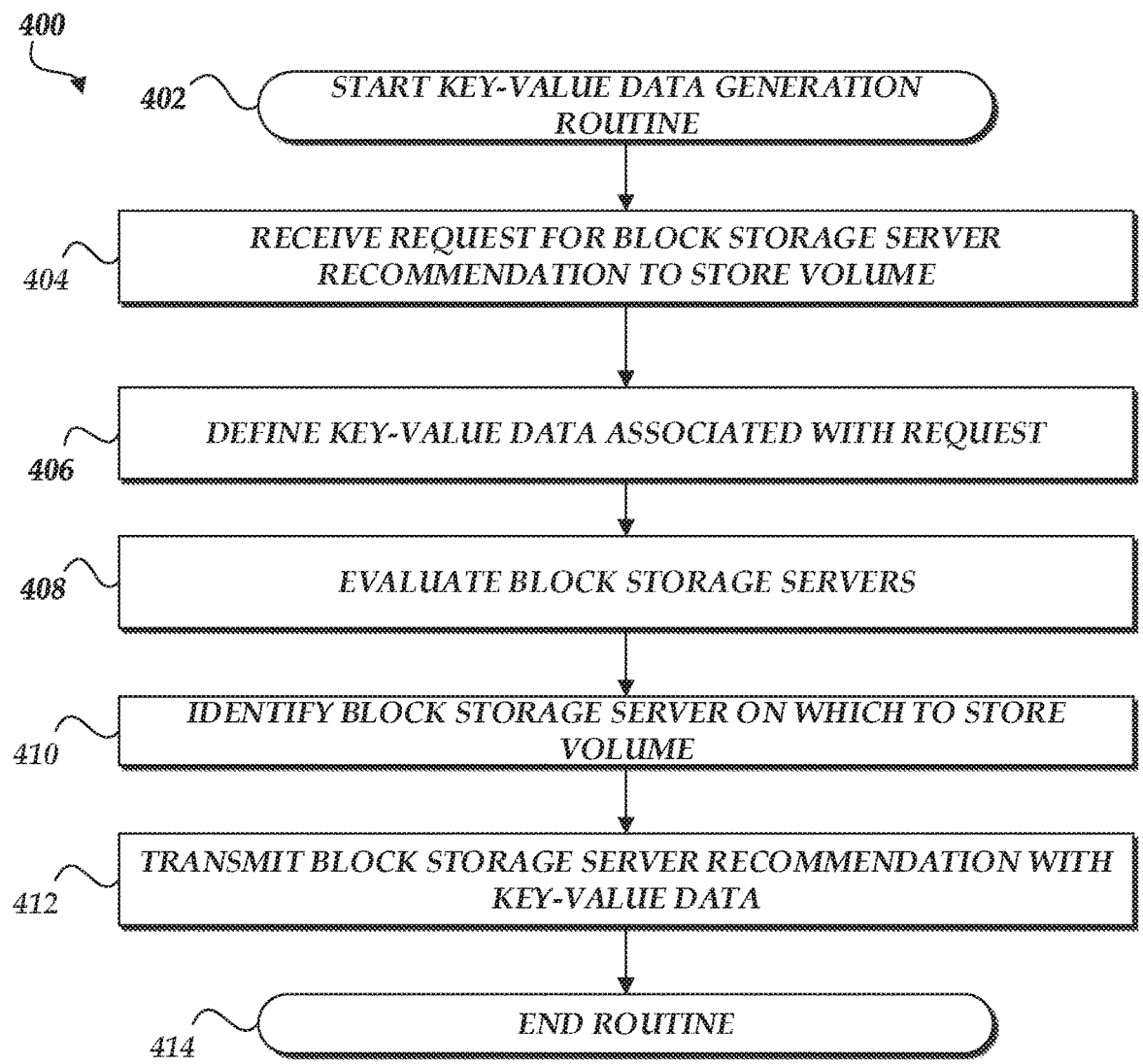
FIG. 4 depicts a flow chart of an example key-value data generation process implemented by a control plane component in the block storage system shown in FIG. 1.

FIG. 4 depicts a flow chart of an example key-value data generation process 400 by a control plane component. The process 400 can be performed by a control plane component, for example, placement component 114.

The process 400 starts the key-value generation process at block 402. At block 404, the placement component 114 receives a request for block storage server recommendation on which to store volume. As illustrated in FIG. 3, the placement component 114 can receive the request for block storage server recommendation from a workflow component 110. In some embodiments, the placement component can receive requests from a block storage server 116A.

At block 406, the placement component 114 defines key-value data associated with the requested volume. The placement component can generate a key-value object that includes a unique identifier for the volume, client namespace, and/or client identifier. The placement component can define key-value pairs for the object with metadata as the key and the corresponding information associated with the volume as the value. In some embodiments, the key-value included in the key-value data can include a volume type, a durability criterion or flag, a resource reservation, or a token bucket level. As an example, the key-value object can include a key "durabilityFlag" and a corresponding value "high" to indicate that the volume associated with that object requires a high durability block storage server placement. For the initialization process 400, the placement component 114 can be configured to collect information associated with the volume from other control plane components. In some embodiments, the request in block 404 can contain data that can be stored as key-value data.

The key value data can also represent a placement constraint, or criterion, associated with the volume. For example, a placement constraint can include limiting volume storage to block storage servers located inside of specified logical or physical localities (e.g., specified server pools, specified locations with respect to other volumes, such as implementing server rack diversity between master and slave replicas of a data volume). Another placement constraint can include a high-durability requirement and require that the recommended block storage server implement high durability architecture. In some embodiments, to implement high durability architecture, the number of replicas or frequency of replicas can be increased. In some embodiments, to implement high durability architecture, servers can be configured to replicate write operations among nodes that share common storage and propagate the nodes to the common storage using erasure encoding. In some embodiments, the request in block 404 identifies the placement constraint. In some embodiments, the placement component 114 collects information regarding the placement constraints from control plane components.

At block 408, the placement component 114 evaluates the block storage servers 116A, 116B for a potential block storage recommendation based on the characteristics of the block storage server. In some embodiments, evaluation of the block storage servers 116A, 116B comprises determining that the placement component stores information regarding the block storage servers. The placement component can query and store information regarding each of the block storage servers such as, for example, server build status, server capacity, power and network topology, volume activity.

At block 410, the placement component 114 creates a block storage server recommendation based on identifying a block storage server that satisfies the placement constraints. The placement component 114 can implement filtering to remove from evaluated potential block storage servers for the volume those block storage servers which do not satisfy placement constraints for the volume. The placement component 114 can filter out block storage servers with insufficient capacity to host the volume (e.g., insufficient processing, storage, and/or network capability to host the volume), and/or blacklisted or otherwise explicitly excluded block storage servers (e.g., a list of unavailable network addresses). The placement component 114 can further identify potential block storage servers according to a desirability of hosting a volume on the block storage server, such as based on a configuration of the block storage server (e.g., availability and suitability of specific hardware) and current load on the host (e.g., currently hosted volumes, usage of those volumes, etc.).

At block 412, the placement component 114 transmits a block storage server recommendation with the defined key-value data to the requester of block 404, such as the volume workflow component 110. In some embodiments, the placement component 114 transmits the block storage server recommendation and the key-value data in the same response payload. In some embodiments, the placement component 114 transmits block storage server recommendation and key-value data in separate responses. In some embodiments, the placement component 114 transmits an encrypted or obfuscated version of the key-value data. As a result, the encrypted or obfuscated key-value data can only be read by authorized control plane components. This encryption or obfuscation can prevent modification or processing of the key-value data by block storage servers or other unauthorized control plane components.

At block 414, the key-value data generation process ends.

Figure 5A:
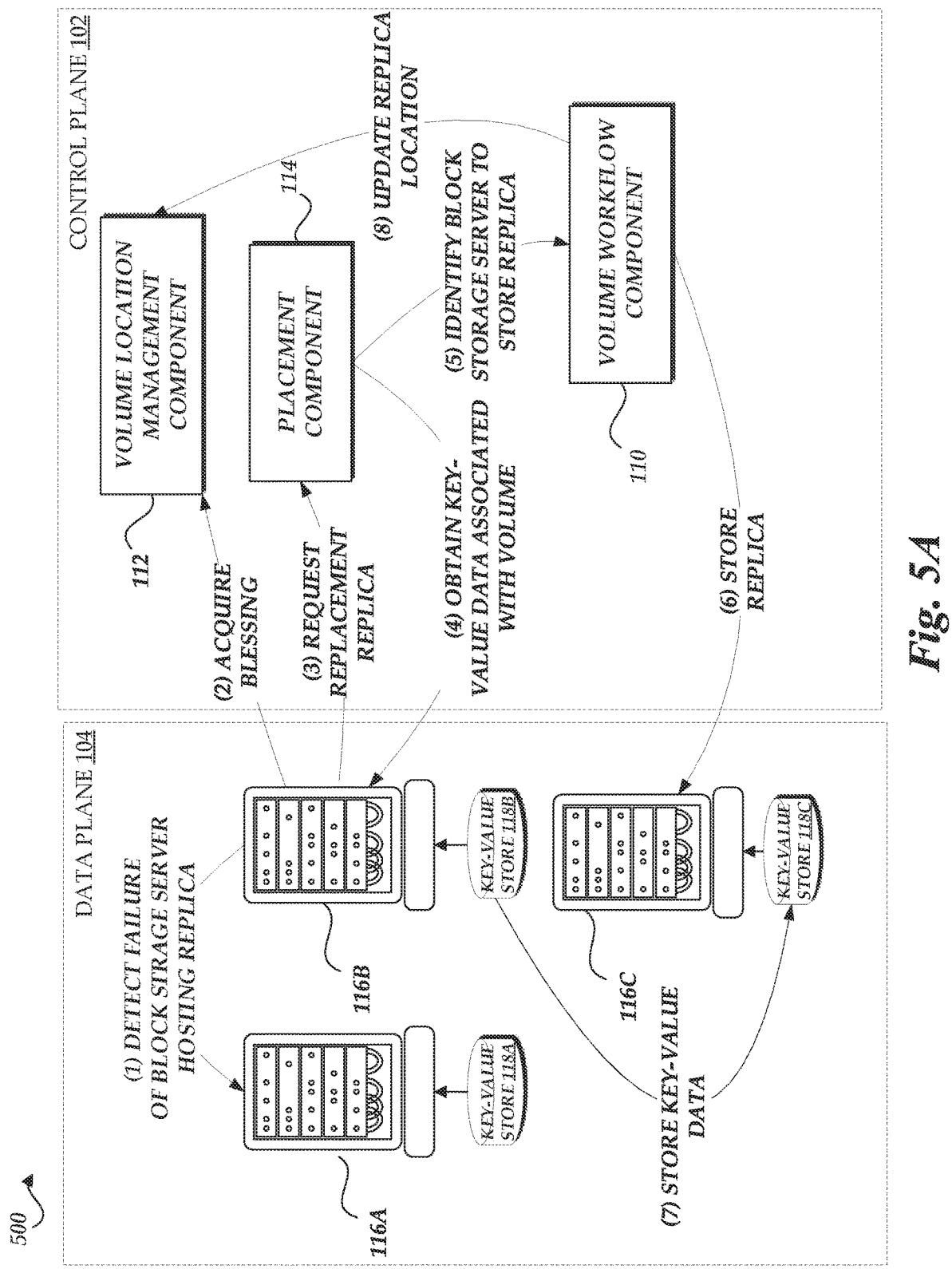
FIG. 5A depicts a schematic diagram of an example workflow for relocating replica in the block storage system shown in FIG. 1.

Example Replica Relocation Process Implementing Data Plane Persisted Key-Value Data FIG. 5A depicts a schematic diagram illustrating the interactions between components during an example re-mirroring process 500 implemented by the block storage system 100 comprising a control plane 102 and a data plane 104.

At (1), a block storage server 116B hosting the master volume detects that a block storage server 116A hosting a replica of the volume has failed. In some embodiments, a failure is detected when the block storage server 116B loses communication with block storage server 116A. At (2), the block storage server 116B reports the failure to the volume location management component 112 in the control plane 102 and acquires a confirmation, or a blessing, from the volume location management component 112 to request a new block storage server to host a replica of the volume.

At (3), the block storage server 116B transmits a request for a replacement replica to the placement component 114. In some embodiments, a control plane component can transmit the request to the placement component 114 in place of the block storage server 116B. For example, the placement component can determine that a replica is to be relocated to optimize replica locations (e.g., implementing server rack diversity between volume and replicas) and invoke replacement of the replica. In some embodiments, the volume workflow component 110 can transmit a request for a replica to the placement component 114 as part of the initialization process 400.

At (4), the placement component obtains key-value data associated with the volume from the key-value store 118B of the block storage server 116B. The block storage server 116B can respond to an API call from the placement component 114 to transmit the key-value data stored in the key-value store 118B. The key-value data can indicate a placement criterion for the volume. The key-value data can also include general metadata describing the volume, for example, size, performance, volume type, and client identifier. In some embodiments, (4) can occur simultaneously with (3). For example, the block storage server 116B can transmit the key-value data along with the request for replacement replica.

Figure 6:
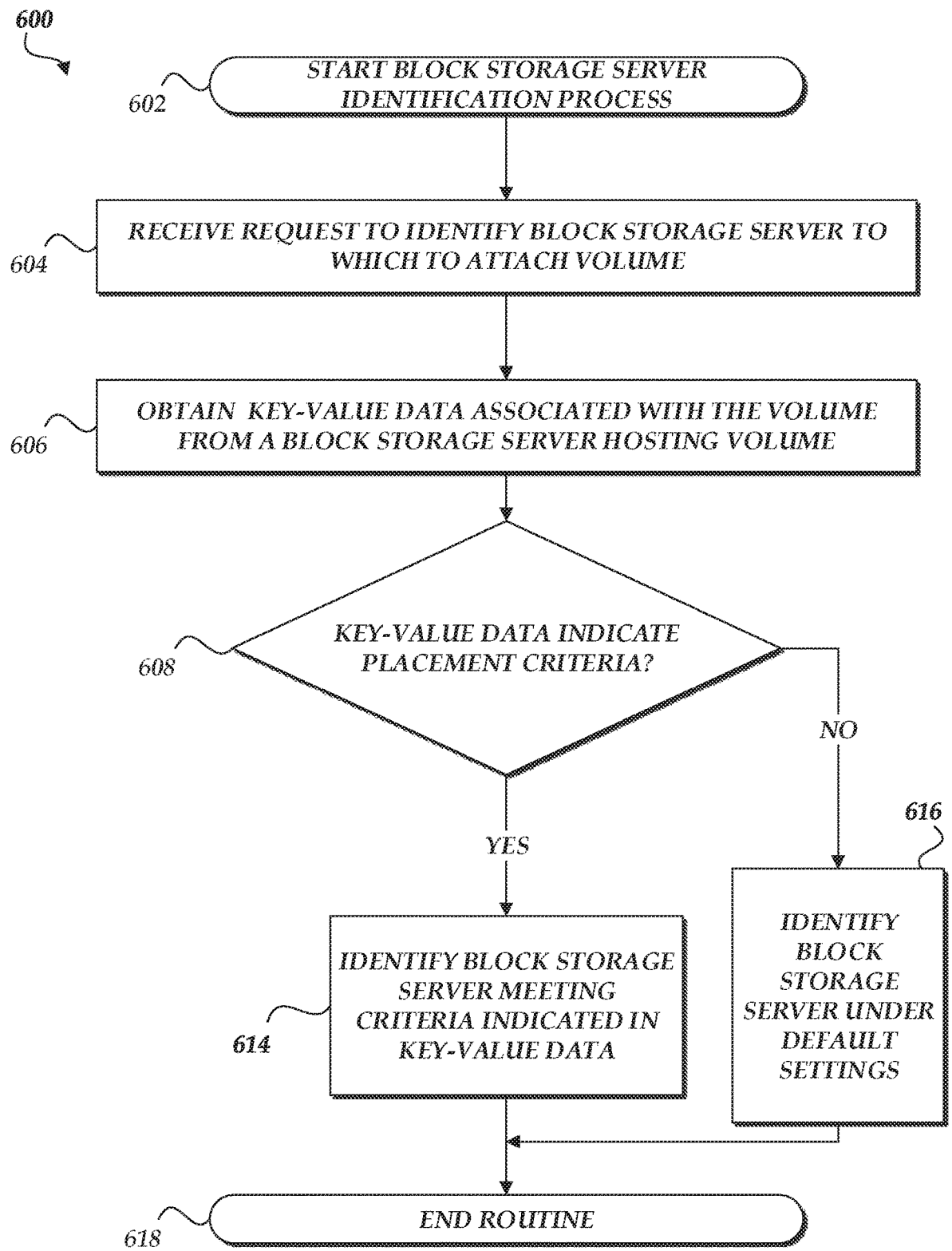
FIG. 6 depicts a flow chart of an example block storage server recommendation process implemented by a control plane component in the block storage system shown in FIG. 1.

At (5), the placement component 114, identifies a block storage server 116C to store the replica, implementing the process 600 as described in FIG. 6, and transmits the identification to the volume workflow component 110. At (6), the workflow component 110 stores the replica to the identified block storage server 116C. At (7), the key-value data initially stored in the key-value store 118B of the block storage server 116B is stored in the key-value store 118C of the block storage server 116C. At (8), the workflow component 110 updates the location of the replica as recorded at the volume location management component 112. In some embodiments, (6), (7), and (8) can occur simultaneously, or in any order. In some embodiments, one control plane component can be configured to identify the block storage server to store the replica and further store the volume on the block storage server.

Figure 5B:
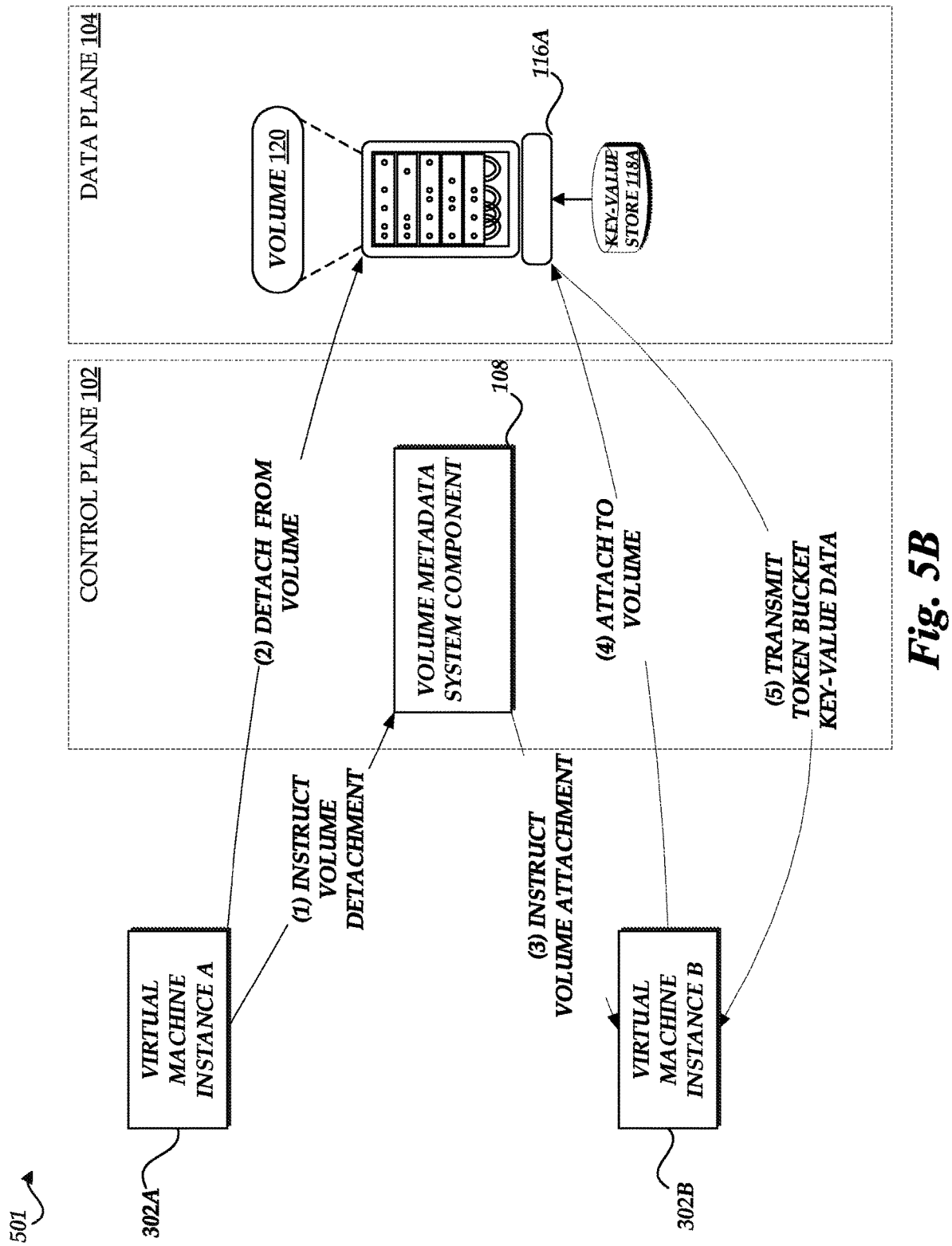
FIG. 5B depicts a schematic diagram of an example workflow for detaching and attaching a volume stored in the block storage system shown in FIG. 1.

Example Detachment and Reattachment Process Implementing Data Plane Persisted Key-Value Data FIG. 5B depicts a schematic diagram illustrating the interactions between components during an example detachment and reattachment, or migration process 501 implemented by the block storage system 100 comprising a control plane 102 and a data plane 104. A virtual machine 302A, block storage system, or compute server 206 can implement token bucket schema to monitor a client's input/output operations to a volume stored on the block storage system. To maintain operational load of the block storage system, the block storage system, the virtual machine instance, or compute server 206 can throttle a client's access to the volume when the client's token bucket reaches a certain threshold. The block storage 100 can implement process 501 to ensure that token bucket data is persisted even when access to a volume is migrated, thus, improving accuracy and reliability of the throttling mechanism. It should be understood that though FIG. 5B illustrates an example migration process 501 with token bucket data as the key-value data, other key-value data can be persisted during migration by implementing process 501. For instance, process 501 can be implemented to persist Input/Output fencing (I/O fencing) parameters during migration. A block storage system 100 can implement I/O fencing parameters to ensure that a client can access only one copy of a volume when the block storage system 100 stores multiple copies of a volume (such as a master volume and replicas).

FIG. 5B depicts a detachment of a volume 120 from virtual machine instance A 302A and reattachment of the volume 120 to a virtual machine instance B 302B. Detachment can refer to severing the connection between the block storage server storing the volume 120 and the virtual machine instance 302A. In some embodiments, detachment can comprise revoking access to the volume 120 by the virtual machine instance 302A. Attachment can refer to establishing the block storage server storing the volume 120 as a virtualized storage disk for the virtual machine instance 302A. In some embodiments, attachment or reattachment comprises invoking access to the volume 120 to the virtual machine instance 302A. Virtual machine instances 302A, 302B can be hosted on compute servers 206. A networked computing environment 200 may apply a treatment to a volume, such as throttling access to the volume or applying I/O fencing designations, to maintain durability and efficacy of the networked computing environment 200. For example, a networked computing environment 200 can implement a throttling feature by monitoring input/output operations to the volume 120 via a token bucket. It may be desirable to migrate the volume 120 from one virtual machine instance 302A to another 302B without resetting the token bucket such that the treatment of the volume is maintained after detachment and reattachment.

At (1), virtual machine instance A 302A instructs volume detachment to a control plane component such as the volume metadata system component 108. The instructions can include identification of a virtual machine instance B 302B to attach the volume 120. In some embodiments, a volume metadata system component 108 can invoke detachment of a volume in response to another control plane component. For example, a placement component 114, as part of proactive placement routine, can determine that a volume is to be detached and reattached in order to optimize the placement of the volume. In some embodiments, the destination block storage server can be identified by the placement component 114. At (2), the volume 120 is detached from virtual machine instance A 302A. At (3), the volume metadata system component 108 instructs volume attachment to virtual machine instance B 302B. The instruction can include the volume identifier for the volume 120 or other data associated with the volume. In some embodiments, the detachment and reattachment operations can be cached or monitored on a control plane component. At (4), virtual machine instance B 302B attaches to volume 120. In some embodiments, attachment comprises giving virtual machine instance 302B access to volume 120.

At (5), the block storage server 116A transmits the token bucket key-value data associated with the volume 120 stored in the key-value store 118A. In some embodiments, the key-value data can be transmitted to the virtual machine instance 302B or the compute server 206 hosting the virtual machine instance. The token bucket data can represent a record of input/output operations requested by the client on the volume. Thus, the token bucket data is persisted through the migration of the volume. The networked computing environment 200, compute servers 206, and/or the virtual machine instance B 302B can continue to monitor I/O operations to the volume to enable throttling without resetting the token bucket. If the I/O operations in the token bucket exceed a certain threshold, then access to the volume can be throttled. In some embodiments, the IOPS rate can be reduced. In some embodiments, the access can be throttled by the compute servers 206, virtual machine instance 302, or block storage servers 202. In some embodiments, the threshold is set according to a client subscription. In some embodiments, the key-value data can comprise other information associated with the volume 120, such as general metadata, I/O fencing parameters, placement constraints, or other information indicating a treatment to be applied to volume. For example, the key-value data transmitted at (5) can include I/O fencing parameters. For example, the I/O fencing parameter stored in the key-value data may indicate that the migrated volume is designated as the master volume. If the I/O fencing parameter indicates that the volume is designated as the master volume, the virtual machine instance is permitted to send read/write requests to the volume. If the I/O fencing parameter indicates that the volume is designated as a replica, virtual machine instance is not permitted to send read/write requests to the volume. In some embodiments, the determination to permit or not permit read/write requests can be performed by the compute server 206, the block storage servers 202, or the virtual machine instance 302. Thus, I/O fencing designation has been persisted through the migration.

Example Block Storage Server Identification Process

FIG. 6 depicts a flow chart of a block storage server identification process 600 by a control plane component in the control plane 102 implementing the present disclosure. For example, placement component 114 implements block storage server identification process 600 when the block storage system 100 implements the relocation process 500.

The process 600 starts at block 602. At block 604 the placement component 114 in the control plane 102 receives a request to identify a block storage server on which to store a volume. The volume can be a master version of the volume or a replica. The request at block 604 can be received from a control plane component in response to a client request to create a replica. The request at block 604 can be received from a block storage server requesting a new replica in response to a failure of the previous block storage server hosting the replica. The request at block 604 can be generated by a control plane component to implement an optimization routine.

At block 606, the placement component 114 obtains key-value data associated with the volume from the block storage server hosting the remaining copy of the volume. The placement component can identify the volume by the volume key or identifier and transmit to the block storage server to cause the block storage server to respond with the corresponding key-value data assigned to the volume key. In some embodiments, the block storage server can transmit the key-value data with the request to identify block storage server.

At decision block 608, the placement component 114 determines whether the key-value data indicates a placement criterion or constraint. A placement criterion may include a volume type, a performance characteristic, or a durability requirement. For example, the key-value data may indicate that the volume is to be placed on an SSD. As a further example, the key-value data may indicate a high-durability criterion. If the key-value data indicates a placement condition, the process 600 proceeds to block 614. At block 614, the placement component 114 evaluates the block storage servers for a potential block storage server recommendation based on the characteristics of the block storage servers. The placement component 114 can query and store information regarding each of the block storage servers such as, for example, server build status, server capacity, power and network topology, volume activity. The placement component 114 identifies a block storage server recommendation based on identifying a block storage server that satisfies the placement conditions as identified in the key-value data. For example, if the key-value data indicated a high-durability condition, the placement component 114 identifies a block storage server configured with a high durability architecture. In some embodiments, to implement high durability architecture, the number of replicas or frequency of replicas can be increased. In some embodiments, to implement high durability architecture, servers can be configured to replicate write operations among nodes that share common storage and propagate the nodes to the common storage using erasure encoding.

If the key-value data does not indicate a placement criterion, the placement component 114 identifies a block storage server under a default optimization routine or other algorithm. The placement component 114 can filter out block storage servers with insufficient capacity to host the volume (e.g., insufficient processing, storage, and/or network capability to host the volume), and/or blacklisted or otherwise explicitly excluded block storage servers (e.g., a list of unavailable network addresses). The placement component 114 can further identify potential block storage servers according to a desirability of hosting a volume on the block storage server, such as based on a configuration of the block storage server (e.g., availability and suitability of specific hardware) and current load on the host (e.g., currently hosted volumes, usage of those volumes, etc.).

At block 618 the process ends. In some embodiments, ending the process can include transmitting the identifier or address of the identified block storage server to a control plane component.

Example Computing System

Figure 7:
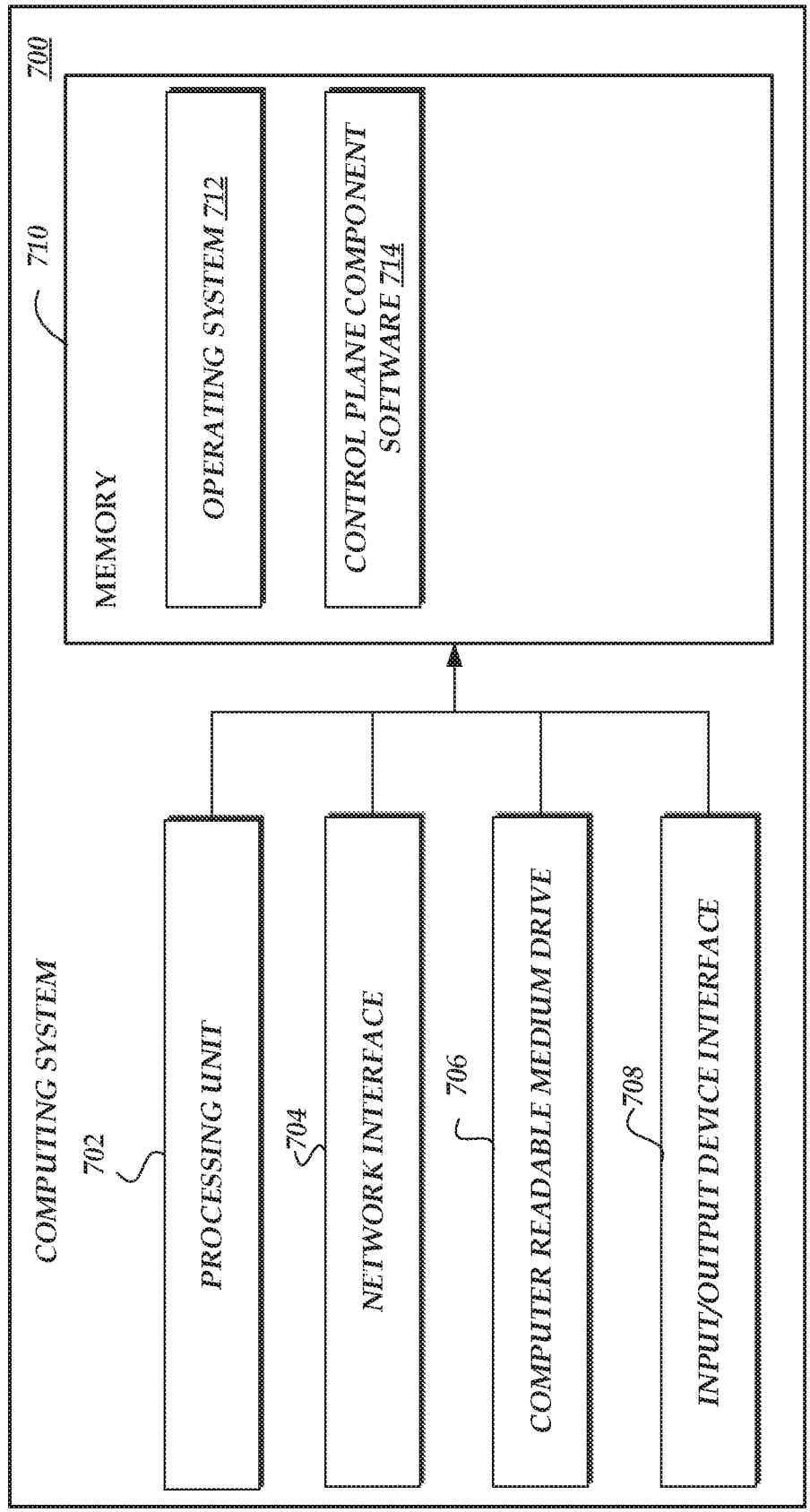
FIG. 7 depicts a schematic diagram of a general architecture of a computing system configured to implement a control plane component of the block-based storage system shown in FIG. 1.

FIG. 7 depicts a schematic diagram of an example computing system, according to some embodiments. In some embodiments, one or more of the control plane components can be implemented on a computing system as illustrated in FIG. 7. In some embodiments, the computing system as illustrated in FIG. 7 can be implemented as a server. In other embodiments, the computing system illustrated in FIG. 7 may be implemented as a block storage server. In some embodiments, as shown, the computing system 700 may include: one or more computer processors 702, such as physical central processing units (CPUs); one or more network interfaces 704, such as a network interface cards (NICs); one or more computer readable medium drives 706, such as a high density disk (HDDs), solid state drives (SDDs), flash drives, and/or other persistent non-transitory computer-readable media; one or more input/output device interface 708; and one or more computer readable memories 710, such as random access memory (RAM) and/or other volatile non-transitory computer-readable media.

Processing unit 702 may be any suitable processors capable of executing instructions. For example, in various embodiments, processing unit 702 may be general-purpose or embedded processors implementing any of a variety of instruction set architectures (ISAs), such as the x86, PowerPC, SPARC, or MIPS ISAs, or any other suitable ISA. The computing system 700 also includes one or more network communication devices (e.g., network interface 704) for communicating with other systems and/or components over a communications network (e.g., Internet, LAN, etc.).

Network interface 704 may be configured to allow data to be exchanged between computer system 700 and other devices attached to a network. In addition, network interface 704 may be configured to allow communication between computer system 700 and various I/O devices and/or remote storage. Network interface 704 may commonly support one or more wireless networking protocols (e.g., Wi-Fi/IEEE 802.11, or another wireless networking standard). In some embodiments, network interface 704 may support communication via any suitable wired or wireless general data networks, such as other types of Ethernet networks, for example. Additionally, network interface 704 may support communication via telecommunications/telephony networks such as analog voice networks or digital fiber communications networks, via storage area networks such as Fibre Channel SANs, or via any other suitable type of network and/or protocol.

The computer readable memory 710 may include computer program instructions that the computer processor 702 executes in order to implement one or more embodiments. For example, the computer readable memory 710 can store an operating system 712 that provides computer program instructions for use by the computer processor 702 in the general administration and operation of a control plane component. The computer readable memory 708 may also include control plane software 714 for implementing the specific function of a control plane component. System memories 710 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory).

In various embodiments, program instructions contained in system memory 710 may be encoded in platform native binary, any interpreted language such as Java byte-code, or in any other language such as C/C++, Java, etc., or in any combination thereof. In some embodiments, program instructions contained in system memory 710 may include instructions executable to implement an operating system (not shown), which may be any of various operating systems, such as UNIX, LINUX, Solaris, MacOS, Windows, etc. Any or all of program instructions stored in system memory 710 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message or request that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer (RESTful) techniques rather than message-based techniques. For example, a network-based service implemented according to a RESTful technique may be invoked through parameters included within an HTTP method such as PUT, GET, or DELETE, rather than encapsulated within a SOAP message.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm blocks described in connection with the embodiments disclosed herein can be implemented as electronic hardware, or as a combination of electronic hardware and executable software. To clearly illustrate this interchangeability, various illustrative components, blocks, modules, and blocks have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or blocks. Thus, such conditional language is not generally intended to imply that features, elements and/or blocks are in any way required for one or more embodiments or that one or more embodiments necessarily include logic for deciding, with or without other input or prompting, whether these features, elements and/or blocks are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method comprising:
under control of one or more computing devices configured with specific computer executable instructions,
receiving a request to cause a volume of data attached to a first virtual machine instance to be attached to a second virtual machine instance, wherein the volume of data is stored on a data storage server, and wherein the data storage server is distinct from the one or more computing devices and stores key-value data indicating a treatment applied to the volume by the first virtual machine instance;
storing, on the one or more computing devices, volume metadata associated with the treatment applied to the volume;
instructing detachment of the volume from the first virtual machine instance;
in response to detecting that the volume metadata stored on the one or more computing devices is unavailable,
instructing the data storage server to transmit, to a compute server hosting the second virtual machine instance, the key-value data indicating the treatment applied to the volume, and
instructing attachment of the volume to the second virtual machine instance, wherein the attachment of the volume to the second virtual machine instance enables application of the treatment indicated by the key value data to the volume.

2. The computer implemented method of claim 1, wherein the treatment indicated by the key-value data comprises access throttling, and wherein application of the treatment indicated by the key value data to the volume comprises throttling access to the volume from the second virtual machine instance.

3. The computer implemented method of claim 2, wherein the key-value data is associated with input/output operations performed on the volume, and wherein throttling access to the volume from the second virtual machine instance comprises determining that input/output operations associated with the key-value data exceed a threshold.

4. The computer implemented method of claim 2, wherein throttling access to the volume from the second virtual machine instance comprises reducing input/output operations per second capacity.

5. The computer implemented method of claim 1, wherein the treatment indicated by the key-value comprises Input/Output (I/O) fencing, and wherein application of the treatment indicated by the key-value data to the volume comprises applying I/O fencing to the volume.

6. The computer-implemented method of claim 5, wherein applying I/O fencing to the volume comprises permitting read/write operations on the volume according to an I/O fencing parameter indicated in the key-value data.

7. The computer-implemented method of claim 5, wherein applying I/O fencing to the volume comprises prohibiting read/write operations on the volume according to an I/O fencing parameter indicated in the key-value data.

8. The computer-implemented method of claim 1, wherein application of the treatment to the volume is provided by the compute server hosting the second virtual machine instance.

9. A system comprising:
one or more computing devices comprising at least a processor, the one or more computing devices configured to at least:
receive a request to migrate access to a volume from a first virtual machine instance to a second virtual machine instance, wherein the volume is collectively stored on a set of data storage servers, wherein each data storage server of the set of data storage servers stores key value data indicating a treatment applied to the volume by the first virtual machine instance, and wherein the one or more computing devices are distinct from the set of data storage servers;
store, on the one or more computing devices, volume metadata associated with the treatment applied to the volume;
cause access to the volume by the first virtual machine instance to be revoked;
in response to detecting that the volume metadata stored on the one or more computing devices is unavailable,
cause transmission, from a data storage server of the set of data storage servers to a compute server hosting the second virtual machine, of the key-value data indicating the treatment applied to the volume, and
cause access to the volume by the second virtual machine instance to be invoked, wherein the invocation of access to the volume by the second virtual machine instance enables application of the treatment indicated by the key value data to the volume.

10. The system of claim 9, wherein the treatment indicated by the key-value data comprises access throttling, and wherein application of the treatment indicated by the key value data comprises throttling access to the volume from the second virtual machine instance.

11. The system of claim 10, wherein the key-value data is associated with input/output operations performed on the volume, and wherein throttling access to the volume from the second virtual machine instance comprises determining that input/output operations associated with the key-value data exceed a threshold.

12. The system of claim 10, wherein throttling access to the volume from the second virtual machine instance comprises reducing input/output operations per second capacity.

13. The system of claim 9, wherein the treatment indicated by the key-value data associated with the volume comprises Input/Output (I/O) fencing, and wherein application of the treatment indicated by the key value data comprises applying I/O fencing to the volume.

14. The system of claim 13, wherein applying I/O fencing to the volume comprises permitting read/write operations on the volume according to an I/O fencing parameter indicated in the key-value data.

15. The system of claim 13, wherein applying I/O fencing to the volume comprises prohibiting read/write operations on the volume according to an I/O fencing parameter indicated in the key-value data.

16. A system comprising:
a set of data storage servers having stored thereon the volume of data, wherein particular data storage servers of the set of data storage server include a memory configured to store key-value data associated with input/output operations performed on the volume by the first virtual machine instance; and
a set of control plane servers in communication with the set of data storage servers, wherein the set of control plane servers is distinct from the set of data storage servers, and wherein the set of control plane servers are configured to at least:
store, on the set of control plane servers, volume metadata associated with input/output operations performed on the volume;
receive a request to migrate access to the volume from a first virtual machine instance hosted in a set of computing servers to a second virtual machine instance hosted in the set of computing servers;
instruct detachment of the volume from the first virtual machine instance; and
in response to detecting that the volume metadata stored within the set of control plane servers is unavailable,
instruct transmission, from a data storage server of the set of data storage servers to a computing server of the set of computing servers hosting the second virtual machine instance, of the key-value data associated with input/output operations performed on the volume by the first virtual machine instance, and
instruct attachment of the volume to the second virtual machine instance, wherein the attachment of the volume to the second virtual machine instance enables the computing server of the set of computing servers hosting the second virtual machine instance to throttle access to the volume based at least on the key-value data.

17. The system of claim 16, wherein the request to migrate access to the volume is generated by the first virtual machine instance.

18. The system of claim 16, wherein the request to migrate access to the volume is generated by a control plane server of the set of control plane servers.

19. The system of claim 16, wherein the computing server of the set of computing servers hosting second virtual machine instance throttles access to the volume based at least on the key-value data in response to determining that the input/output operations associated with the key-value data exceed a threshold.

20. The system of claim 16, wherein the computing server of the set of computing servers hosting second virtual machine instance throttles access to the volume by reducing input/output operations per second capacity.

* * * * *

UNITED STATES PATENT AND TRADEMARK OFFICE
CERTIFICATE OF CORRECTION

| | |
|---|---|
| PATENT NO. | : 11,237,747 B1 |
| APPLICATION NO. | : 16/434063 |
| DATED | : February 1, 2022 |
| INVENTOR(S) | : Greenwood et al. |

It is certified that error appears in the above-identified patent and that said Letters Patent is hereby corrected as shown below:

In the Drawings

Sheet 5 of 8, FIG. 5A, reference numeral 104, Line 3, delete "STRAGE" and insert --STORAGE--.

Sheet 7 of 8, FIG 6, reference numeral 604, Line 1, delete "SERVER TO" and insert --SERVER ON TO--.

In the Specification

Column 2, Line 52, delete "(SDD)" and insert --(SSD)--.

Column 8, Line 31, delete "116a" and insert --116A--.

Column 10, Line 43, delete "166B." and insert --116B.--.

Column 11, Line 43, delete "key value" and insert --key-value--.

Column 16, Line 40, delete "(SDDs)" and insert --(SSDs)--.

In the Claims

Column 20, Line 38, In Claim 1, delete "key value" and insert --key-value--.

Column 20, Line 12, In Claim 1, delete "computer implemented" and insert --computer-implemented--.

Column 20, Line 42, In Claim 2, delete "key value" and insert --key-value--.

Column 20, Line 39, In Claim 2, delete "computer implemented" and insert --computer-implemented--.

Signed and Sealed this
Nineteenth Day of April, 2022

*Katherine Kelly Vidal*

Katherine Kelly Vidal
*Director of the United States Patent and Trademark Office*

CERTIFICATE OF CORRECTION (continued)
U.S. Pat. No. 11,237,747 B1

Column 20, Line 45, In Claim 3, delete "computer implemented" and insert --computer-implemented--.

Column 20, Line 51, In Claim 4, delete "computer implemented" and insert --computer-implemented--.

Column 20, Line 55, In Claim 5, delete "computer implemented" and insert --computer-implemented--.

Column 21, Line 13, In Claim 9, delete "key value" and insert --key-value--.

Column 21, Line 33, In Claim 9, delete "key value" and insert --key-value--.

Column 21, Lines 36-37, In Claim 10, delete "key value" and insert --key-value--.

Column 21, Line 51, In Claim 13, delete "key value" and insert --key-value--.